Feb. 8, 1944. W. H. MARTIN 2,341,458
WELDER
Filed March 13, 1939 3 Sheets-Sheet 2

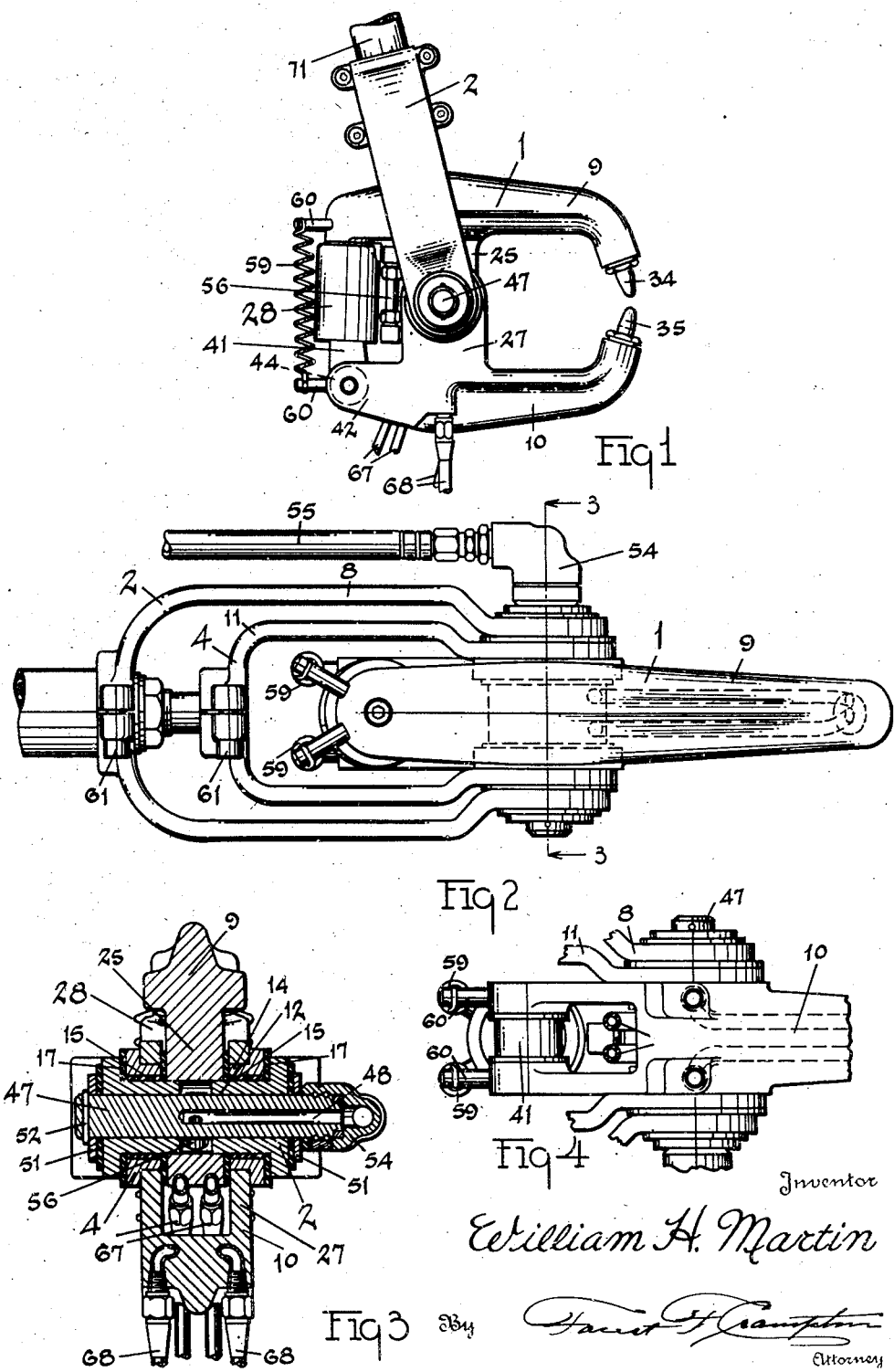

Inventor
William H. Martin
By
Attorney

Feb. 8, 1944. W. H. MARTIN 2,341,458
WELDER
Filed March 13, 1939 3 Sheets-Sheet 3

Inventor
William H. Martin

Patented Feb. 8, 1944

2,341,458

UNITED STATES PATENT OFFICE 2,341,458

WELDER

William H. Martin, Pleasant Ridge, Mich., assignor to Progressive Welder Company, a corporation of Michigan Application March 13, 1939, Serial No. 261,438

15 Claims. (Cl. 219—4)

My invention has for its object to provide an efficient welder having electrode-operating parts pivotally connected to the conductor parts for enabling free angular movements of the welder relative to the conductor parts and producing, simultaneously, a high electric contact pressure of the electrode-operating parts on the conductor parts, when the welder electrodes are pressed against the work, at a welding pressure.

The invention provides means for connecting an electric cable to a welder, whereby the welder may be readily moved to any angle, with reference to the cable, without bending the cable, which enables the welder to be easily manipulated during the welding operations.

The invention, also, provides means for the transmission of fluid pressure to a pressure-operated welder along the axis of angular movement of the welder relative to the electric conductors to enable ready movement of the welder to any angle, with reference to the fluid pressure and the electric conductors.

The invention consists in other features which will appear from the following description and upon examination of the drawings forming a part hereof. Structures containing the invention may partake of different forms and may be varied in their details and still embody the invention. To illustrate a practical application of the invention, I have selected a welder as an example of structures containing the invention and shall describe the selected structure hereinafter, it being understood that certain features of my invention may be used to advantage without a corresponding use of other features of the invention and without departing from the spirit of the invention as presented in the claims. The particular structure selected is shown in the accompanying drawings.

Figure 5:
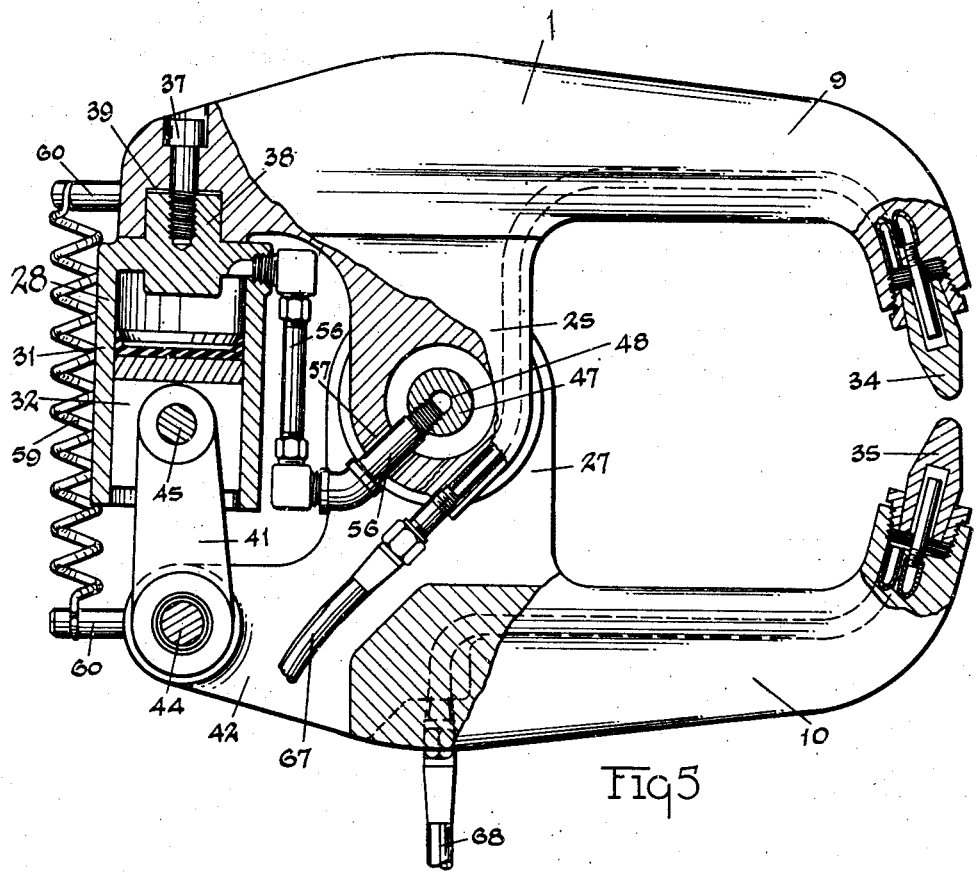
Figure 6:
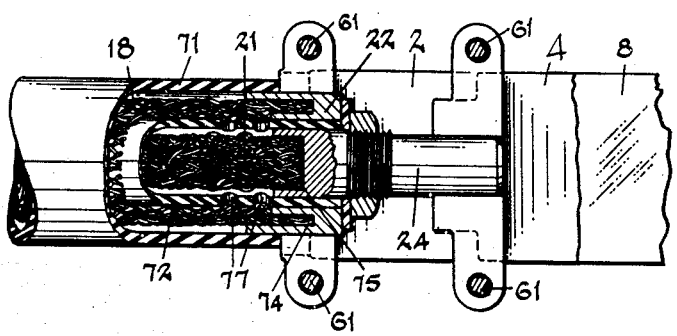
Figure 7:
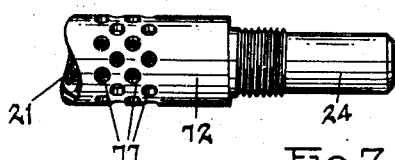
Figure 8:
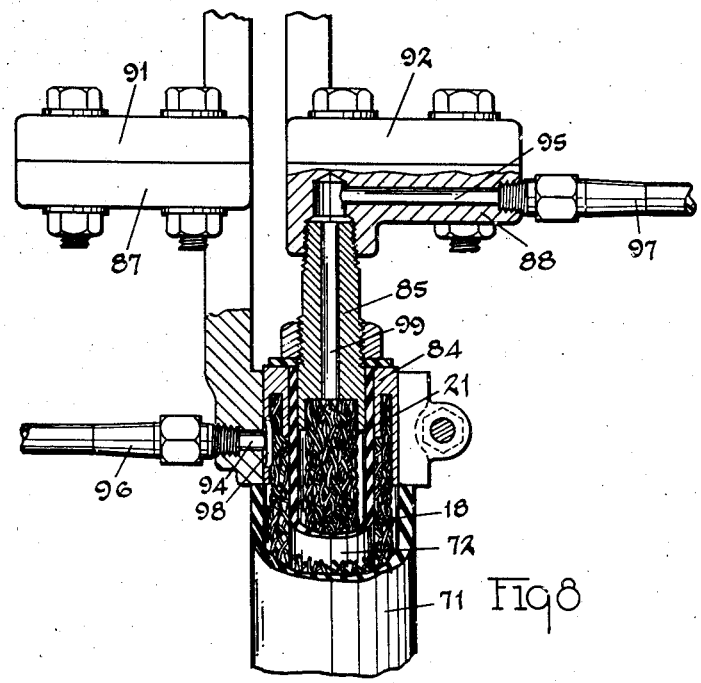
Figure 9:
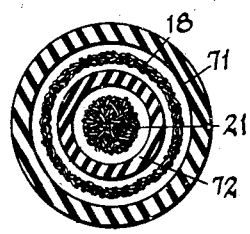

Fig. 1 illustrates a side view of the welder. Fig. 2 illustrates a top view of the welder. Fig. 3 illustrates a view of a section of the welder taken on the plane of the line 3—3 indicated in Fig. 2. Fig. 4 illustrates a bottom view of a central part of the welder. Fig. 5 illustrates a side view of the welder, parts of the welder being broken away to show details of its construction. Fig. 6 illustrates connector terminals of a flexible cable to the welder. Fig. 7 illustrates a detailed view of an end part of an electric and liquid conductor. Fig. 8 illustrates the connector terminals of the flexible cable with the secondary of a transformer that produces the welding current. Fig. 9 illustrates a view of the section of the flexible cable.

The welder 1 is electrically connected to a pair of rigid, substantially closed, concentrically disposed conductors 2 and 4 that extend substantially through the center of gravity of the welder and on which the welder may be pivotally supported. The rigid conductors 2 and 4 comprise the U-shaped conductor bars 8 and 11 and inwardly extending bosses 12 and 14. The bosses protrude inward from the ends of the conductor bars 8 and 11 and are coaxially disposed. The bosses of one bar may be located within the bosses of the other bar. Preferably, the conductor bars 8 and 11 are formed of two parts, each of the parts having bosses protruding toward each other so that, when the welder is assembled, the bosses of each of the conductor bars form substantially concentric sleeves. The bosses are electrically insulated from each other by suitable sleeves and washers 15 and 17. The conductor bars 8 and 11 are connected to flexible conductors 18 and 21 through connectors 22 and 24. The flexible conductors connect the bars 8 and 11 with a source of welding current.

The welder has a pair of electrode arms 9 and 10 that are pivotally supported on the bosses 12 and 14. The arms 9 and 10 are provided with inwardly extending lugs 25 and 27. The lug 25 of the arm 9 contacts with the bosses 12, and the lugs 27 of the arm 10 contact with the bosses 14. Preferably, openings are formed in the lugs 25 and 27 and the arms 9 and 10 are located relative to each other to dispose the openings in coaxial relationship to each other, and the openings are formed of a size to receive the bosses 12 or 14 to pivotally support the arms 9 and 10 to permit pivotal movements of the arms within the U-shaped bars 8 and 11. Thus, the rigid conductors 2 and 4 formed by the U-shaped bars 8 and 11 and their protruding parts constitute a pair of concentric loop or ring conductors that extend through, substantially, the center of gravity of the welder and enable free pivotal movements of the welder relative to the conductors and the electric conductor cable, which is connected to the conductors 2 and 4 and, also, free pivotal movements of the arms and their electrodes relative to the electric conductor parts when the arms are moved, one relative to the other, to engage the work.

The arms 9 and 10 are operated by a pressure means 28, comprising a cylinder 31 and a piston 32, to cause electrodes 34 and 35 to engage the work. The electrodes 34 and 35 are connected to ends of the arms 9 and 10 located on one side of the axis of rotation of the arms. The cylinder 31 and the piston 32 are connected to the ends of the arms 9 and 10 located on the other side of the axis of rotation. The cylinder 31 is connected to the arm 9 by means of a screw 37, which extends through the end of the arm 9 and into a tapped opening formed in a boss 38, located on one end of the cylinder 31, to tightly draw the boss into a socket 39 formed in the arm 9. The piston 32 is connected to the arm 10 by means of a piston link 41. The ends of the link 41 are connected to the ears 42 located on the arm 10 and to the piston 32 by the pivot pins 44 and 45.

The cylinder 31 is operated by fluid pressure transmitted along the axis of rotation of the welder to enable rotative movements of the welder, with respect to the conductor parts. The cylinder is connected through the bosses 12 and 14 and the openings formed in the lugs 25 and 27 of the arms 9 and 10 by means of a cylindrical connector 47 that fits central openings formed in the bosses 12. One end of the connector 47 is closed and the other end is axially bored to form a passageway 48 extending to a central part of the connector 47. The connector 47 is secured with reference to the rigid conductors 2 and 4 by means of the washers 51 and the pin 52 located at one end of the connector, and the head 54 is pivotally connected to the other end of the connector. The head 54 is connected to the source of fluid pressure by means of the pipe 55. The head 54 is rotatively connected to the connector to permit rotative movements of the body of the connector with the welder when the welder is rotated relative to the electric conductors and the pressure pipe 55.

The upper end of the cylinder 31 is connected to the connector 47 through a pipe 56 that extends through an opening 57 formed in the lug 25 of the arm 9. Thus, the cylinder 31 may be connected through a suitable valve to a source of fluid pressure to operate the piston 32 and cause the electrodes 34 and 35 to engage the work and, at the same time, to cause a high contact pressure between the bosses 12 and 14 and the bearing surfaces of the lugs 25 and 27 of the arms 9 and 10 to conduct the current from the rigid conductors 2 and 4 to the electrodes 34 and 35 and produce the weld.

When the pressure within the cylinder 31 ceases, the piston 32 is returned and the pressure of the electrodes 34 and 35 on the work is released by means of a spring 59 which is connected to the pins 60 that are secured in the arms 2 and 4 in the region of the cylinder 31 and the piston link 41.

In order to assemble the welder parts, the bosses 12 of the parts of the conductor bar 8 are disposed within the bosses 14 of the conductor bar 11 and the insulating sleeves and washers 15 and 17 and, when thus disposed, the bosses 12 of the conductor bar 8 are inserted in the lug 25 of the arm 9, and the bosses 14 of the conductor bar 11 are inserted within the lugs 27 to electrically connect the bosses 12 with the arm 9 and the bosses 14 with the arm 10. The connector 47 is then inserted and secured by the pin 52. The electric connectors 22 and 24 of the flexible conductors 18 and 21 may then be inserted intermediate the ends of the parts of the conductor bars 8 and 11, and the parts of the conductor bars are clamped about the connectors 22 and 24 by the screws 61. The flexible conductors, which are connected to a suitable source of welding current, such as a secondary of a transformer, are, thus, connected to the welder electrodes 34 and 35.

The electrodes 34 and 35 are cooled by the flow of a cooling liquid which is directed through pipes 67 which, preferably, extend through the space formed between the lugs 27 and the ears 42 of the arm 10 that communicate with the electrode 34 through passageways formed in the arm 9. Also, a cooling liquid is directed through pipes 68, which communicate with passageways in the arm 10 that lead to the interior of the electrode 35.

The flexible conductors 18 and 21 are coaxially disposed and are located in flexible pipes 71 and 72. The flexible conductors 18 and 21 are formed of loosely interwoven small strands of wire that form interstices therein and which enable some free movement of the cooling liquid therethrough. The ends of the conductors 18 and 21 protrude into sockets 74 and 75 formed in each of the connectors 22 and 24, the flexible conductor 21 being located within the conductor 18. The connector 24 is located within the connector 22 and the socket 74 is formed annular. When the connectors are inserted in the sockets of the respective connectors, the ends are soldered therein to retain the connection of the conductors with the connectors. The pipe 72 is formed of insulating material, such as flexible rubber, and operates to electrically insulate the conductors. The pipe 72 has an interior diameter larger than the exterior diameter of the conductor 21, and, consequently, an annular passageway is formed within the pipe 72 through which a cooling liquid may be caused to flow along the conductor. Also, the inner diameter of the conductor 18 is larger than the exterior diameter of the pipe 72 and the outer diameter of the conductor 18 is smaller than the interior diameter of the pipe 71 which, also, forms passageways through which the cooling liquid may flow along the conductor 18. In the vicinity of the connection of the conductors 18 and 21 with the connectors 22 and 24, the pipe 72 is provided with openings 77 through which the cooling liquid may flow from the interior of the pipe into the pipes 71 and 72 through the loose mesh or weave of the conductor 18 to the outer surface of the conductor 18.

The flexible conductors 18 and 21 are connected by the connectors 84 and 85 to the extensions 87 and 88 of the terminals 91 and 92 of the secondary of a transformer in which a welding current is caused to flow in timed relation to the production and maintenance of the welding pressure. The extensions 87 and 88 are provided with passageways 94 and 95 to which are connected pipes 96 and 97, and the connectors 84 and 85 are provided with passageways 98 and 99 that communicate with the interior of the pipes 71 and 72. Thus, a cooling liquid, such as water, may be directed through the pipe 97 into the pipe 72 and along the conductor 21 through the openings 77 and into the pipe 71 and along the conductor 18 to a point of discharge through the pipe 96.

I claim:

1. In a welder, a pair of electrodes; a pair of arms for supporting the electrodes; a fluid-pressure means for oscillatably operating one of the arms; a pair of conductors connected to the electrodes; and a member having a fluid-pressure passageway connected to the pressure means for conducting fluid pressure thereto and extending through the pivotal axis of one of the arms for pivotally supporting one of the arms relative to the other.

2. In a welder, a pair of electrodes; a pair of electric conductors; a pair of arms for supporting the electrodes, each of the arms pivotally supported by one of the conductors; and a fluid-pressure means for operating the arms, one of the conductor members having a fluid passageway within the member and connected to the pressure means for transmitting fluid under pressure to the pressure means.

3. In a welder, a pair of arms; a pair of electrodes and a pressure means connected to the arms for pressing the electrodes against the work; a source of welding current; a source of fluid pressure; and electric and pressure transmission conductors connected to the welder for relative pivotal movements of the welder and the conductors and for electrically connecting each electrode to said source of welding current and transmitting pressure from said source of fluid pressure to the pressure means.

4. In a welder, a pair of electrodes; a pair of arms, each arm supporting an electrode; a pair of welding current conductors, at least one conductor having a portion on which one of said arms may move and be supported; and means for moving said arm on said portion to cause the electrode supported by said arm to engage work and to press the arm against said conductor portion.

5. In a welder, a pair of electrodes; a pair of arms, each arm suporting an electrode; a pair of conductors for the welding current; and means for relatively moving the arms to cause electrode engagement of work and relative pressure between at least one arm and one conductor.

6. In a welder, a pair of electrodes; a pair of arms, each arm supporting an electrode; a pair of welding current conductors, at least one conductor pivotally connected to an arm for substantially free and unresisted pivotal movements of said arm; and means for moving said arm to cause electrode engagement of work and pressure of the arm against a conductor.

7. In a welder, a pair of electrodes; a pair of arms, each arm supporting an electrode; a pair of conductors for the welding current; and means common to the arms and conductors for connecting each conductor to an arm and for supporting each arm for pivotal movements relative to each conductor and arm and about a common axis.

8. In a welder, a pair of electrodes; a pair of arms, each arm supporting an electrode; a pair of conductors for the welding current, each conductor having a pair of spaced parts for receiving an arm therebetween; and means extending between and engaging said parts for connecting said parts to an arm and for supporting the arm for pivotal movements relative to said parts.

9. In a welder, a pair of electrodes; a pair of arms, each arm supporting an electrode; a pair of conductors for the welding current, each conductor having a pair of spaced parts for receiving an arm therebetween; and means extending between and engaging the parts of both conductors for connecting each pair of parts to an arm and for supporting each arm for pivotal movements about a common axis and relative to each conductor and arm.

10. In a welder, a pair of electrodes; a pair of pivotally supported arms, each arm supporting an electrode; a fluid-pressure means operably connected to at least one arm for pivotally moving the same relative to the other arm; a pair of conductors for the welding current; and means, including a member having a fluid-pressure passageway connected to the fluid-pressure means for conducting fluid pressure thereto and extending through the pivotal axis of one arm, for connecting and supporting each arm to and for pivotal movements relative to a conductor.

11. In a welder, a pair of electrodes; a pair of pivotally supported arms, each arm supporting an electrode; a fluid-pressure means operably connected to at least one arm for pivotally moving the same relative to the other arm; a pair of conductors for the welding current; and means, including a member having a fluid-pressure passageway connected to the fluid-pressure means for conducting fluid pressure thereto and extending through the pivotal axis of both arms, for connecting each arm to a conductor for pivotal movements of each arm relative to the conductors and the other arm about a common axis.

12. In a portable welding gun, a pair of electrodes, a pair of arms, each arm supporting a corresponding said electrode and at least one of said arms being formed of conducting material, a pair of welding current conductors, each having means adapting it for connection to a remotely located source of welding current, at least one said conductor having a surface portion directly engaged by said one arm and on which said one arm may move and be supported, and means for moving said arm on said portion to cause said electrodes to engage the work and to press said one arm against said engaged portion of said conductor, said arm and said engaged portion of said one conductor when so pressed together forming a path through which at least the major portion of said welding current flows.

13. In a portable welding gun, a pair of electrodes, a pair of arms, each arm supporting a corresponding said electrode and at least one of said arms being formed of conducting material, a pair of welding current conductors, each having means adapting it for connection to a remotely located source of welding current, at least one said conductor having a surface portion directly engaged by said one arm and on which said one arm may move and be supported, and means for moving said arm on said portion to cause said electrodes to engage the work, said engagement of the work producing a reactant pressure which presses said one arm against said engaged portion of said conductor, said arm and said engaged portion of said one conductor when so pressed together forming a path through which at least the major portion of said welding current flows.

14. In a portable welding gun, a pair of electrodes, a pair of arms, each arm supporting a corresponding said electrode and at least one of said arms being formed of conducting material, a pair of welding current conductors, each having means adapting it for connection to a remotely located source of welding current, at least one said conductor having a surface portion directly engaged by said one arm and on which said one arm is supported for pivotal movement relative to said one support between work engaging and retracted positions, and means for pivoting said one arm on said portion to cause said electrodes to engage the work and to press said one arm against said engaged portion of said conductor, said arm and said engaged portion of said one conductor when so pressed together forming a path through which at least the major portion of said welding current flows.

15. In a portable welding gun, a pair of electrodes, a pair of arms, each arm supporting a corresponding said electrode and at least one of said arms being formed of conducting material, a pair of welding current conductors, each having means adapting it for connection to a remotely located source of welding current, at least one said conductor having a surface portion directly engaged by said one arm and on which said one arm is supported for pivotal movement relative to said one support between work engaging and retracted positions, and means for pivoting said one arm on said portion to cause said electrodes to engage the work, said engagement of the work producing a reactant pressure which presses said one arm against said engaged portion of said conductor, said arm and said engaged portion of said one conductor when so pressed together forming a path through which at least the major portion of said welding current flows.

WILLIAM H. MARTIN.